US011032542B2

(12) United States Patent
Bordes et al.

(10) Patent No.: US 11,032,542 B2
(45) Date of Patent: Jun. 8, 2021

(54) METHOD AND A DEVICE FOR IMAGE ENCODING AND DECODING

(71) Applicant: InterDigital VC Holdings, Inc., Wilmington, DE (US)

(72) Inventors: Philippe Bordes, Laille (FR); Tangi Poirier, Thorigné-Fouillard (FR); Fabien Racape, San Francisco, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/477,514

(22) PCT Filed: Dec. 26, 2017

(86) PCT No.: PCT/EP2017/084587
§ 371 (c)(1),
(2) Date: Jul. 11, 2019

(87) PCT Pub. No.: WO2018/130413
PCT Pub. Date: Jul. 19, 2018

(65) Prior Publication Data
US 2019/0349582 A1    Nov. 14, 2019

(30) Foreign Application Priority Data

Jan. 11, 2017   (EP) ..................... 17305033

(51) Int. Cl.
*H04N 19/117* (2014.01)
*H04N 19/167* (2014.01)
(Continued)

(52) U.S. Cl.
CPC ......... *H04N 19/117* (2014.11); *H04N 19/167* (2014.11); *H04N 19/176* (2014.11); *H04N 19/196* (2014.11); *H04N 19/147* (2014.11)

(58) Field of Classification Search
CPC .. H04N 19/117; H04N 19/167; H04N 19/176; H04N 19/196; H04N 19/147; H04N 19/86
See application file for complete search history.

(56) References Cited

U.S. PATENT DOCUMENTS 9,686,559 B2 *   6/2017   Yamamoto ........... H04N 19/119
9,749,627 B2 *   8/2017   Wu ........................ H04N 19/70
(Continued)

FOREIGN PATENT DOCUMENTS

EP    3057320 A1 *   8/2016   ............ H04N 19/86
EP    3057320 A1       8/2016
(Continued)

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.
(Continued)

*Primary Examiner* — Dramos Kalapodas
(74) *Attorney, Agent, or Firm* — Invention Mine LLC

(57) ABSTRACT

A decoding method for decoding an image is disclosed. The decoding method comprises for at least one slice of the image: —decoding (S210) the slice from a bitstream; —determining (S230) information representative of a size of a region of the decoded slice, the size being different from a size of a basic coding block used for decoding the slice; and—filtering (S240) the decoded slice by applying a filter on the region identified by the determined information.

29 Claims, 7 Drawing Sheets

(51) Int. Cl.
*H04N 19/176* (2014.01)
*H04N 19/196* (2014.01)
*H04N 19/147* (2014.01)

(56) References Cited

U.S. PATENT DOCUMENTS

| | | | | |
|---|---|---|---|---|
| 10,015,515 | B2* | 7/2018 | Guo | H04N 19/523 |
| 10,123,027 | B2* | 11/2018 | Hannuksela | H04N 19/30 |
| 10,136,144 | B2* | 11/2018 | Liu | H04N 19/117 |
| 10,320,867 | B2* | 6/2019 | Denoual | H04L 65/4069 |
| 10,368,097 | B2* | 7/2019 | Aflaki Beni | H04N 19/597 |
| 2012/0177107 | A1* | 7/2012 | Fu | H04N 19/167 375/240.03 |
| 2013/0336386 | A1* | 12/2013 | Chong | H04N 19/182 375/240.02 |
| 2014/0328413 | A1* | 11/2014 | Esenlik | H04N 19/197 375/240.29 |
| 2015/0195533 | A1* | 7/2015 | Hsiang | H04N 19/70 375/240.02 |
| 2016/0286223 | A1* | 9/2016 | Chen | H04N 19/86 |

FOREIGN PATENT DOCUMENTS

| | | | |
|---|---|---|---|
| WO | 2013103893 A1 | 7/2013 | |
| WO | 2015116472 A1 | 8/2015 | |
| WO | 2016144519 A1 | 9/2016 | |
| WO | WO-2016144519 A1 * | 9/2016 | ............. H04N 19/82 |

OTHER PUBLICATIONS

Shih-Ta, Hsiang, et. al., "AHG8: Sample adaptive offset with multiple parameters", Joint Collaborative Team on Video Coding (JCT-VC) of ITU-T SG 16 WP 3 and IS0/IEC JTC 1/SC 29/WG 11, 16th Meeting, Jan. 2014, pp. 1-6.

* cited by examiner

METHOD AND A DEVICE FOR IMAGE ENCODING AND DECODING

This application claims the benefit, under 35 U.S.C. § 365 of International Application PCT/EP2017/084587, filed Dec. 26, 2017, which was published in accordance with PCT Article 21(2) on Jul. 19, 2018, in English, and which claims the benefit of European Patent Application No. 17305033.7, filed Jan. 11, 2017.

1. TECHNICAL FIELD

The present principles generally relate to a method and a device for image encoding and decoding, and more particularly, to a method and a device for image encoding and decoding with in-loop filtering, e.g. with sample adaptive offset filtering.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between group of samples in the original image and in the predicted image, often denoted as residuals, are transformed, quantized and entropy coded. To reconstruct the video, the compressed data is decoded by inverse processes corresponding to the prediction, transform, quantization and entropy coding.

Traditional video coding scheme include in-loop filtering processes for improving the quality of the reconstructed images. In-loop filtering may comprise Deblocking Filtering (DF) followed by Sample Adaptive Offset (SAO) filtering as in HEVC, and/or Adaptive Loop Filtering ALF such as Wiener filters. The Sample Adaptive Offset filtering process is described in section 8.7.3 of the document ITU-T H.265 entitled "High Efficiency Video Coding" (version of April 2015). The SAO filtering comprises adding offsets to some reconstructed samples in order to reduce coding artifacts, e.g. ringing or banding artifact. Two types of filtering may be performed when the SAO filtering is enabled (or activated): Edge Offset (EO) type or Band Offset (BO) type. The SAO filtering reduces sample distortion by first classifying the samples of one CTB (Coding Tree Block) into multiple categories and adding a specific offset to each sample depending on its category. The SAO parameters (such as the offsets) for each color component are thus determined on the encoder side and encoded at a CTU level. A Coding Tree Unit (CTU) corresponding to a CTB contains the CTBs of the encoded color components. It represents the basic processing/coding unit in HEVC and is in that regard similar to the concept of a macroblock in prior video coding standards.

Usually, the SAO parameters for a CTU (i.e. the SAO parameters associated with each CTB of the CTU) are determined to obtain the best compromise in terms of bit-rate and distortion. FIG. 1 depicts a portion of an image. This image portion comprises regions R1, R2 and R3. The region R1 is fully included in the CTB A of CTU A, the region R3 is fully included in the CTB B of CTU B and the region R2 is partially included in the CTB A and partially in the CTB B. Since in HEVC, the SAO parameters are signaled at the CTU level, then the region R1 is filtered using the SAO parameters SAO-A of CTU A and the region R3 is filtered using the SAO parameters SAO-B of CTU B. The region R2 is split into several sub-regions which are filtered with SAO parameters that may be different. The hatched sub-region of R2 is filtered using the SAO parameters SAO-A of CTU A. The black sub-region of R2 is filtered using the SAO parameters SAO-B of CTU B. The samples of R2 may possibly be filtered using different SAO parameters, namely SAO-A and SAO-B, even if they exhibit the same kind of artifacts. In this case, the parameters SAO-A may not be optimal for the region R2 since their values are largely determined on the encoder side based on the samples of the region R1. In the same way, the parameters SAO-B may not be optimal for the region R2 since their values are largely determined based on the encoder side based on the samples of the region R3. It would hence be desirable to improve SAO filtering.

3. BRIEF SUMMARY

A decoding method for decoding an image is disclosed. The decoding method comprises for at least one slice of the image:
  decoding the slice from a bitstream;
  determining information representative of a size of a region of the decoded slice, the size being different from a size of a basic coding block used for decoding the slice; and
  filtering the decoded slice by applying a filter on the region identified by the determined information.

A decoding device for decoding an image is further disclosed that comprises:
  means for decoding the slice from a bitstream;
  means for determining information representative of a size of a region of the decoded slice, the size being different from a size of a basic coding block used for decoding the slice; and
  means for filtering the decoded slice by applying a filter on the region identified by the determined information.

In a variant, a decoding device is disclosed that comprises a communication interface configured to access at least a bitstream and at least one processor configured to:
  decode the slice from a bitstream;
  determine information representative of a size of a region of the decoded slice, the size being different from a size of a basic coding block used for decoding the slice; and
  filter the decoded slice by applying a filter on the region identified by the determined information.

The following embodiments apply to the decoding method and decoding devices disclosed above.

According to a first aspect, the information is further representative of a position of the region within the decoded slice.

According to a specific characteristic, the information is different for at least two decoded slices or pictures of the same sequence.

In a specific embodiment, determining the information comprises decoding an index from a header of the slice, the decoded index referring to size's values.

In another specific embodiment, determining the information comprises decoding an index from a header of the slice, the index referring to ratio's values of the size of the basic coding unit.

According to a specific characteristic, the region is a rectangle. As an example, the region is larger than the basic coding block in at least in one dimension.

Advantageously, applying a filter on the region comprises applying the filter during successive filtering passes and determining the information comprises determining, e.g. decoding, the information for each filtering pass.

Advantageously, the filter is a sample adaptive offset filter.

An encoding method for encoding an image is also disclosed. The encoding method comprises for at least one slice of the image:
  encoding the slice into a bitstream and decoding the slice to obtain a decoded slice;
  determining and encoding information representative of a size of a region of the decoded slice, the size being different from a size of a basic coding block used for encoding the slice; and
  filtering the decoded slice by applying a filter on the region identified by the determined information.

An encoding device for encoding an image is also disclosed that comprises:
  means for encoding the slice into a bitstream and decoding the slice to obtain a decoded slice;
  means for determining and encoding information representative of a size of a region of the decoded slice, the size being different from a size of a basic coding block used for encoding the slice; and
  means for filtering the decoded slice by applying a filter on the region identified by the determined information.

An encoding device is disclosed that comprises a communication interface configured to access at least an image and at least one processor configured to:
  encode the slice into a bitstream and decode the slice to obtain a decoded slice;
  determine and encode information representative of a size of a region of the decoded slice, the size being different from a size of a basic coding block used for encoding the slice; and
  filter the decoded slice by applying a filter on the region identified by the determined information.

A bitstream representative of an image comprising coded data representative of a slice of the image, information representative of a size of a region of a decoded version of the slice, the size being different from a size of a basic coding block used for decoding the slice, and sample adaptive offset parameters associated with the region to be used for filtering the decoded version of the slice by applying a filter on the region identified by the information.

In a variant, a non-transitory processor readable medium having stored thereon a bitstream is disclosed, wherein the bitstream comprises coded data representative of a slice of the image, information representative of a size of a region of a decoded version of the slice, the size being different from a size of a basic coding block used for decoding the slice, and sample adaptive offset parameters associated with the region to be used for filtering the decoded version of the slice by applying a filter on the region identified by the information.

A transmitting method is disclosed that comprises:
  transmitting coded data representative of a slice of the image;
  transmitting information representative of a size of a region of a decoded version of the slice, the size being different from a size of a basic coding block used for encoding the slice; and
  transmitting sample adaptive offset parameters associated with the region to be used for filtering the decoded version of the slice by applying a filter on the region identified by the information.

A transmitting device is disclosed that comprises:
  means for transmitting coded data representative of a slice of the image;
  means for transmitting information representative of a size of a region of a decoded version of the slice, the size being different from a size of a basic coding block used for encoding the slice; and
  means for transmitting sample adaptive offset parameters associated with the region to be used for filtering the decoded version of the slice by applying a filter on the region identified by the information.

A transmitting device is disclosed that comprises a communication interface configured to access an image and at least one processor configured to:
  transmit coded data representative of a slice of the accessed image;
  transmit information representative of a size of a region of a decoded version of the slice, the size being different from a size of a basic coding block used for encoding the slice; and
  transmit sample adaptive offset parameters associated with the region to be used for filtering the decoded version of the slice by applying a filter on the region identified by the information.

The following embodiments apply to the encoding method, coding devices, bitstream, processor readable medium, transmitting method and transmitting devices disclosed above.

According to a first aspect, the information is further representative of a position of the region within the decoded slice.

According to a specific characteristic, the information is different for at least two encoded slices or pictures of the same sequence.

In a specific embodiment, encoding the information is encoded as an index in a header of the slice, the index referring to size's values.

In another specific embodiment, the information is encoded as an index in a header of the slice, the index referring to ratio's values of the size of the basic coding block.

According to a specific characteristic, the region is a rectangle. As an example, the region is larger than the basic coding block in at least in one dimension.

Advantageously, applying a filter on the region comprises applying the filter during successive filtering passes and encoding the information for each filtering pass.

Advantageously, the filter is a sample adaptive offset filter.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

In the following, the word "reconstructed" and "decoded" can be used interchangeably. Usually but not necessarily "reconstructed" is used on the encoder side while "decoded" is used on the decoder side.

In the following sections, a block is composed of samples associated with sample values, e.g. luma samples or chroma samples, etc. A Coding Unit (CU) is composed of one or several coding blocks (CB), namely one per color component. The CBs are collocated in the picture but they may have different size in case of sub-sampling of one component. For example, in case of 4:2:0 chroma sub-sampling, the CB size of the chroma samples is divided by two both horizontally and vertically compared to the luma CB size. A slice is an integer number of basic coding units (BCU) such as coding tree units (e.g. HEVC) or macroblock units (e.g. AVC). A basic coding unit can be further subdivided into smaller blocks for prediction, transform, etc. A slice may consist of a complete picture as well as part thereof. The size of a region is represented by a single value in the case where the region is square while a size of a region is represented by two values (one in each dimension x and y) in the case where the region is rectangular.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode/decode a whole image or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

Figure 1:
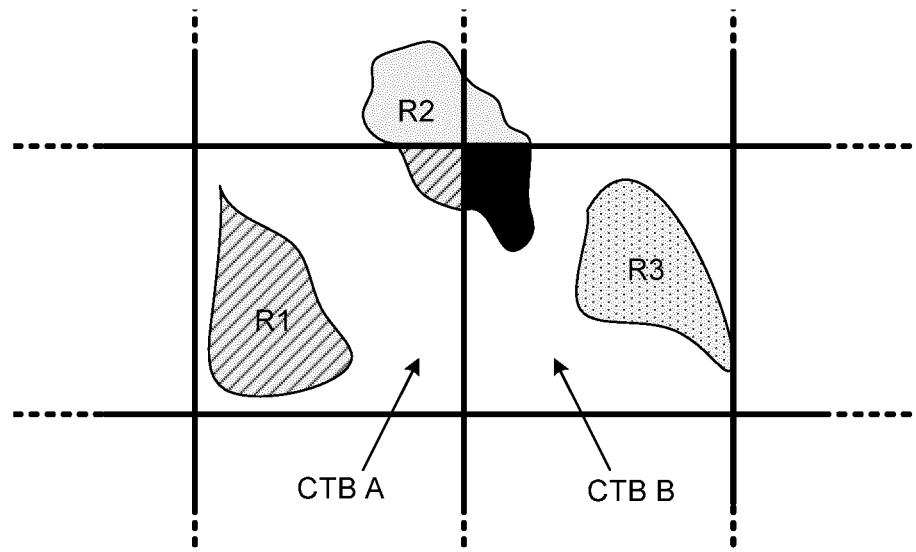
FIG. 1 depicts a portion of an image that comprises regions R1, R2 and R3, wherein R1 is fully included in a coding tree block CTB A, R3 is fully included in a coding tree block CTB B and R2 is partially included in the CTB A and partially in the CTB B.
Figure 2:
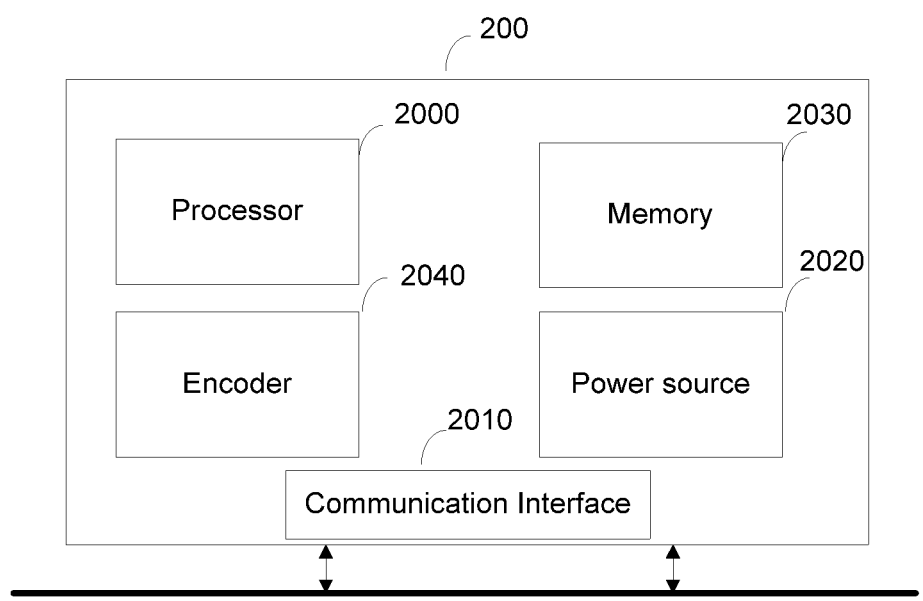
FIG. 2 represents an exemplary architecture of a transmitter configured to encode an image into a bitstream according to a non-limiting embodiment.

FIG. 2 represents an exemplary architecture of a transmitter 200 configured to encode an image in a bitstream according to a non-limiting embodiment.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data (e.g. a bitstream); and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art. The image may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to FIG. 4.

According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown). According to exemplary and non-limiting embodiments, the transmitter 200 can be, but is not limited to:

a mobile device;
a communication device;
a game device;
a tablet (or tablet computer);
a laptop;
a still image camera;
a video camera;
an encoding chip or encoding device/apparatus;
a still image server; and
a video server (e.g. a broadcast server, a video-on-demand server or a web server).

Figure 3:
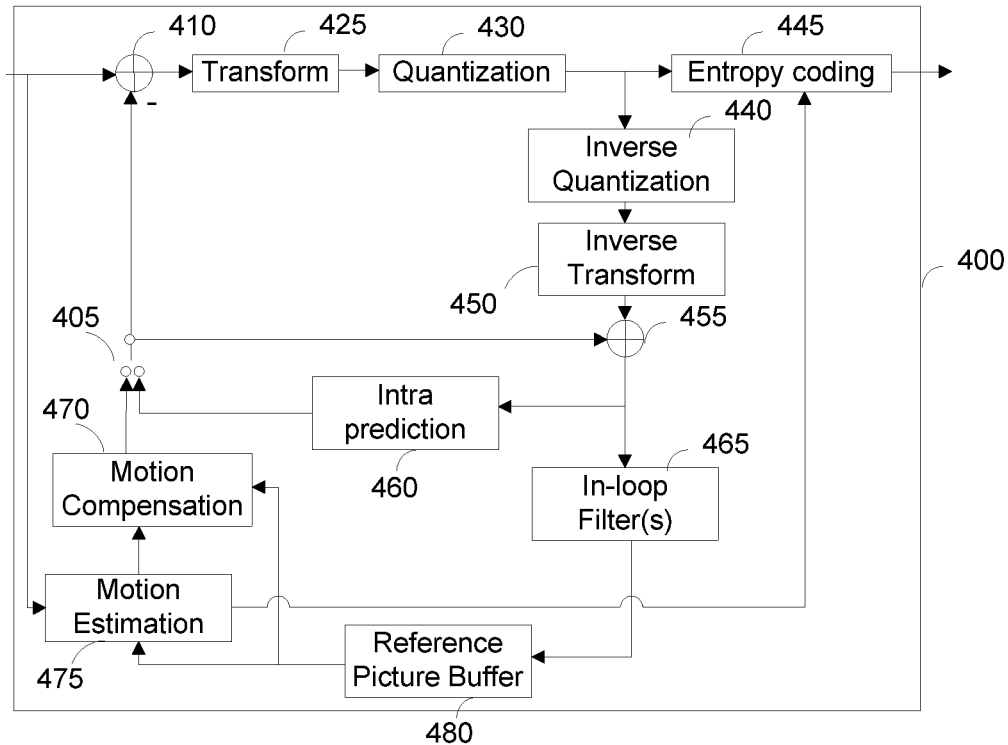
FIG. 3 illustrates an exemplary video encoder according to a non-limiting embodiment.
Figure 4:
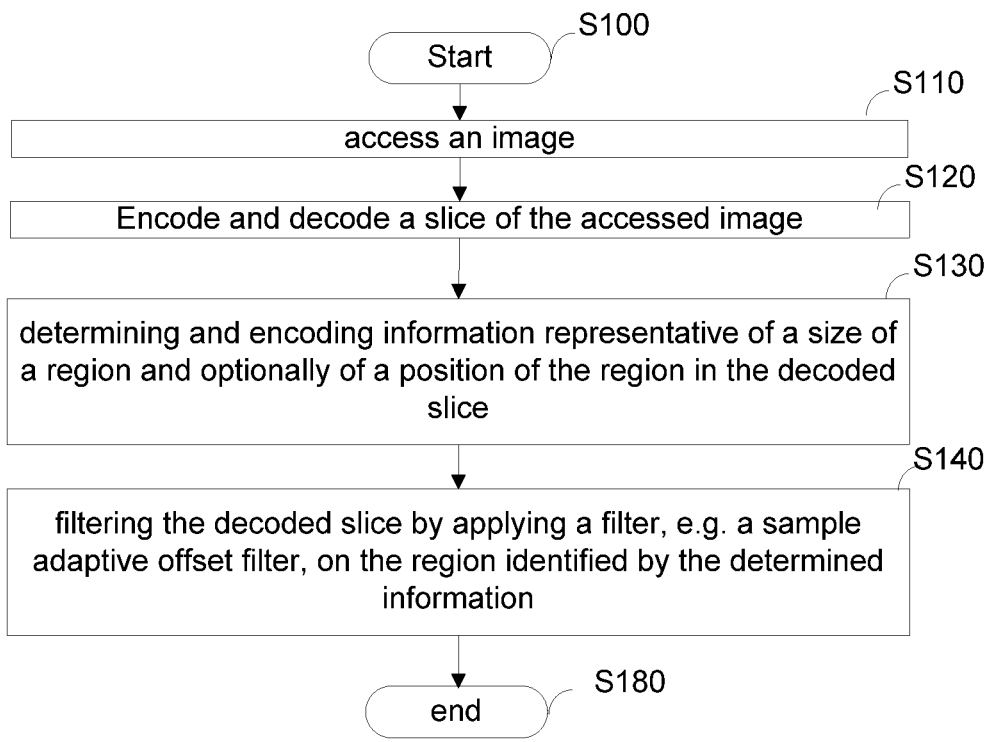
FIG. 4 represents a flowchart of a method for encoding an image block into a bitstream according to a specific and non-limiting embodiment.

FIG. 3 illustrates an exemplary video encoder 400, e.g. a HEVC video encoder, adapted to execute the encoding method of FIG. 4. The encoder 400 is an example of a transmitter 200 or part of such a transmitter 200.

To encode a video sequence with one or more images, an image is partitioned into one or more slices where each slice can include one or more slice segments. A slice segment is organized into coding units, prediction units and transform units. The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, an image is partitioned into basic coding blocks, e.g. into coding tree blocks (CTB) of square shape with a configurable size in HEVC or into macroblocks in H.264, and a set of possibly consecutive basic coding blocks is grouped into a slice. Usually, the basic coding units are of square shape of $2^n \times 2^n$ samples, where n is an integer, e.g. $n \in \{4, 5, 6\}$. In HEVC, the smallest CTU size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264 or H.266. A Coding Tree Unit (CTU) corresponding to a CTB contains the CTBs of the encoded color components. More generally, a basic coding unit corresponding to a basic coding block contains the basic coding blocks of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can be used to refer to a macroblock, a partition and a sub-block as specified in H.264/AVC or other video coding standards, and more generally to refer to an array of samples of various sizes.

In the exemplary encoder 400, an image is encoded by the encoder elements as described below. The image to be encoded is processed in units of CUs. Each CU is encoded using either an intra or inter mode. When a CU is encoded in an intra mode, it performs intra prediction (460). In an inter mode, motion estimation (475) and compensation (470) are performed. The encoder decides (405) which one of the intra mode or inter mode to use for encoding the CU, and indicates the intra/inter decision by a prediction mode flag. Residuals are calculated by subtracting (410) a predicted sample block (also known as a predictor) from the original image block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference index) can be signaled in two methods, namely, "advanced motion vector prediction (AMVP)" and "merge mode." In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference image index are reconstructed based on the signaled candidate.

In HEVC, the precision of the motion information for motion compensation is one quarter-sample for the luma component and one eighth-sample for the chroma components. A 7-tap or 8-tap interpolation filter is used for interpolation of fractional-sample sample positions, i.e., ¼, ½ and ¾ of full sample locations in both horizontal and vertical directions can be addressed for luma.

The residuals are transformed (425) and quantized (430). The quantized transform coefficients, as well as motion vectors and other syntax elements, are entropy coded (445) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (440) and inverse transformed (450) to decode residuals. An image block is reconstructed by combining (455) the decoded residuals and the predicted sample block. An in-loop filter (465) is applied to the reconstructed image, for example, to perform deblocking/SAO (Sample Adaptive Offset) filtering to reduce coding artifacts. The filtered image is stored at a reference image buffer (480).

In HEVC, SAO can be deactivated per CTB (Luma and/or Chroma). Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood. SAO can be applied to the luma and chroma components, where the SAO mode is the same for Cb and Cr components. The SAO parameters (i.e. the offsets, the SAO types EO, BO and inactivated, the class in case of EO and the band position in case of BO) are configured individually for each color component.

It will be understood that, although the terms SAO region, SAO parameters, SAO filter(ing) are used herein to describe encoding/decoding methods and encoding/decoding apparatus, these methods and apparatus should not be limited by SAO filtering and any other filter (e.g. Adaptive Loop Filter, Wiener Filter) may be used according to the present principles in which case SAO region may be called filtering region, SAO parameters may be called filtering parameters.

FIG. 4 represents a flowchart of a method for encoding an image block in a bitstream according to a specific and non-limiting embodiment.

The method starts at step S100. At step S110, a transmitter, e.g. such as the encoder 400, accesses an image. At step S120, the transmitter encodes and decodes a slice of the accessed image in order to obtain a decoded slice.

Encoding the slice usually comprises encoding the blocks of the slice. Encoding a block usually but not necessarily comprises subtracting a predictor from the block to obtain a block of residuals, transforming the block of residuals into a block of transform coefficients, quantizing the block of coefficients to obtain a quantized block of transform coefficients and entropy coding the quantized block of transform coefficients in the bitstream.

Decoding the slice usually comprises decoding the blocks of the slice. Decoding a block on the encoder side usually but not necessarily comprises de-quantizing and inverse transforming the quantized block of transform coefficients to obtain a block of residuals and adding a predictor to the block of residuals to obtain a decoded block.

At step S130, information representative of a size of a region and optionally of a position of the region in the decoded slice is determined and encoded in the bitstream. In the case where the slice is partitioned into several filtering regions, e. g. into SAO regions, as depicted on FIG. 5, several sets of filtering parameters are determined (one per filtering region). For example, for each candidate of region-size (and possibly position), the encoder may select the best sets of filtering parameters.

For example, for each SAO region, the encoder may evaluate the encoding cost and signal distortion obtained for several sets candidates of SAO parameters and select the set candidate of SAO parameters corresponding to the best trade-off between encoding costs (bit rate) and distortion for this SAO region. As an example, a set of SAO parameters may comprise the following parameters: offsets, SAO types EO, BO and inactivated, a class in case of EO and a band position in case of BO. Other filters may have other set of parameters.

Finally, the encoder select the SAO region-size (and possibly position) corresponding to the best trade-off between encoding costs (bit rate) and distortion for all the SAO regions.

In an example, only information representative of the size of the region is determined, the position of the region in the decoded slice being inferred to be (0, 0) or another pre-defined value. The region is also called a SAO region since it is a region where the SAO filtering is to be applied and for which a single set of SAO parameters is defined. The information (size and possibly position) determined at step S130 is shared by all the components, the size and position being re-scaled for a component in the case where the component is sub-sampled. For example, in 4:2:0, the SAO region size and position for the chroma components is divided by two both horizontally and vertically compared to the SAO region size and position of the luma component.

In a first embodiment, the information representative of the size of the SAO region is inferred from a profile. In the HEVC standard, a combination of "profile", "tiers" and "level" makes it possible to define subsets of the entire bitstream syntax that is specified in this Recommendation International Standard. In HEVC, SAO filtering is applied on the samples of each CTB of a CTU. One could define a new profile for which the SAO region size is different from a CTB size. In the same way, the information representative of the position of the SAO region may also be inferred from the profile.

In another embodiment, the information representative of the position of the SAO region in the decoded slice is encoded in the bitstream, e.g. in a header of the slice or in a header of a slice segment. This information comprises, for example, syntax elements (e.g. sao_region position_x and sao_region position_y or sao_region position[i] with i=0 for x and i=1 for y) that represent the coordinates in x and y of one sample of the SAO region in the decoded slice (e.g. its top-left sample as depicted on FIG. 5 for the second column/row filtering region). This embodiment is illustrated in table 2. In a variant, the position is encoded relatively to the CTB size. As an example, the information comprises syntax element(s) (e.g. k_x and k_y) that represent ratio(s) of CTB size. In the case where the CTB size is equal to 256 and the SAO region (e.g. its top-left sample) is located at x=64 and y=64, the encoded ratios are k_x=0.25 and k_y=0.25. Possibly the ratio are encoded using 2 integers for denominator and numerator. In another example, the position in x and y of the SAO region of the second column/line may be equal to CTB_size/$2^n$. In this latter case, the syntax element may indicate the value of n. In yet another variant, the information is a syntax element idx_sao_region position which is an index defining the position of the SAO region in a set of predefined positions. This latter case is illustrated in table 3.

In an example, the regions are shifted with respect to the CTB grid. In this latter case, the information is a syntax element indicating the value of the shift relatively to the CTB grid.

Figure 10:
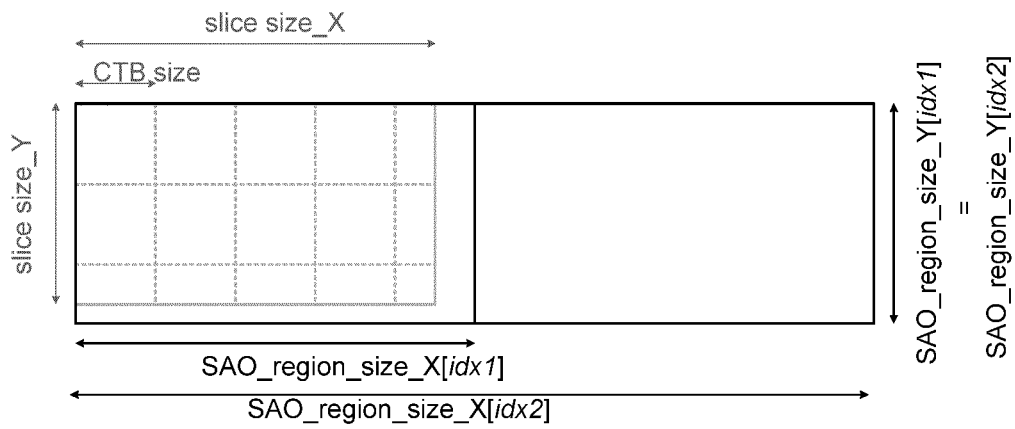
FIG. 10 depicts a slice and two SAO regions according to a specific and non-limiting embodiment.

In the same way, the information representative of the size of the region may also be encoded in the bitstream, e.g. in a header of the slice or in a header of a slice segment. This information comprises, for example, syntax elements (e.g.

sao_region_size_x and sao_region_size_y or sao_region_size[i] with i=0 for x and i=1 for y) that represent the size in x and y of the SAO region. In a variant, a single syntax element that represents the size of the SAO region in one dimension, either x or y, is encoded in the case where the SAO region is known to be square. In a variant, the size is encoded relatively to the CTB size. As an example, the information comprises syntax element(s) (e.g. k_x and k_y) that represent ratio(s) of CTB size. In the case where the CTB size is equal to 128 and the SAO region's size is equal to 64×64, the encoded ratios are k_x=0.5 and k_y=0.5. In a variant, a single ratio is encoded (either k_x or k_y) in the case where the SAO region is known to be square. In yet another variant, the information is a syntax element idx_sao_region_size which is an index defining the size of the SAO region in a set of predefined sizes as illustrated in tables 3 and 4. In the case where the CTB_size is equal to 128 and the SAO region is of square shape, the size of the region may be encoded as an index idx_region_size that may take for example 4 values {0, 1, 2, 3}. Each index corresponds to a size of the region. The index 0 corresponds to a size equal to the CTB size (128×128), the index 1 corresponds to a size equal to 1.5 times the CTB size (192×192), the index 2 corresponds to twice the CTB size (256×256), and the index 3 corresponds to a size equal to three times the CTB size (384×384). Advantageously, the number of indices is limited by the picture or slice size. For example, if the intersection of a first SAO region whose size is identified by a first index idx1 and of the slice is the same as the intersection of a second SAO region whose size is identified by a second index idx2 and of the slice, then the SAO region size corresponding to idx2 is removed and the number of index range values is reduced by one. This is depicted in example of FIG. 10 where the intersection corresponds to the slice itself.

The size of the region may be encoded using a single index idx_sao_region_size coded with respect to the CTB_size. For example, idx_sao_region_size may take 8 values in the set {0, 1 . . . 7}. The index value indicates a horizontal ratio and a vertical ratio to be applied on the CTB_size to obtain the region size as indicated in table 1. As an example, for a CTB of size 128×128, in the case where the idx_sao_region_size=2, the region is of rectangular shape (the horizontal and vertical ratios are different). Its width is equal to 256 (2.0*128) and its height is equal to 128 (1.0*128). As another example, for a CTB of size 128×128, in the case where the idx_sao_region_size=7, the region is of square shape (the horizontal and vertical ratios are the same). Its width is equal to 512 (4.0*128) and its height is equal to 512 (4.0*128). In the case where the region is known to be square, the index may refer to a single ratio since the same ratio is to be applied in both dimensions.

TABLE 1

| | idx_region_size | | | | | | | |
|---|---|---|---|---|---|---|---|---|
| | 0 | 1 | 2 | 3 | 4 | 5 | 6 | 7 |
| horizontal ratio | 1.0 | 1.5 | 2.0 | 2.0 | 3.0 | 4.0 | 4.0 | 4.0 |
| vertical ratio | 1.0 | 1.5 | 1.0 | 2.0 | 3.0 | 2.0 | 3.0 | 4.0 |

Figure 5:
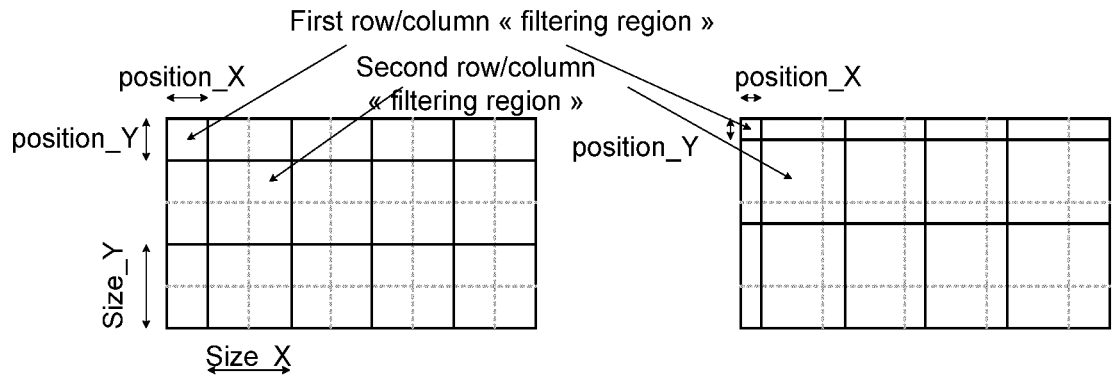
FIG. 5 depicts an exemplary slice divided into basic coding blocks (grey dashed lines) and filtering regions (black lines)

Once a size and possibly a position of a region are defined, the slice may be further partitioned into several regions by repeating the same pattern as depicted on FIG. 5. The first lines/column of SAO regions may be different if the values of sao_region_position_x and sao_region_position_y are not zero. The last line/column of SAO regions may be different since the slice size is not necessarily a multiple of the region's size.

In a specific and non-limiting embodiment, the syntax elements representative of the position and of the size are encoded in the slice header as indicated in the tables 2, 3 and 4 below. In these tables, the differences from the HEVC syntax structure are indicated in italics.

TABLE 2

| slice_segment_header( ) { | Descriptor |
|---|---|
| ... | |
| if( *sao_adaptive_region_enabled_flag* ) { | |
| slice_sao_luma_flag | u(1) |
| slice_sao_chroma_flag | u(1) |
| *if ( slice_sao_luma_flag ||* | |
| *slice_sao_chroma_flag ) {* | |
| *sao_region_position[ ]* | u(8) |
| *sao_region_size[ ]* | u(8) |
| } | |
| } | |
| ... | |

TABLE 3

| slice_segment_header( ) { | Descriptor |
|---|---|
| ... | |
| if( *sao_adaptive_region_enabled_flag* ) { | |
| slice_sao_luma_flag | u(1) |
| slice_sao_chroma_flag | u(1) |
| *if ( slice_sao_luma_flag ||* | |
| *slice_sao_chroma_flag ) {* | |
| *idx_sao_region_position* | u(8) |
| *idx_sao_region_size* | u(8) |
| } | |
| } | |
| ... | |

TABLE 4

| slice_segment_header( ) { | Descriptor |
|---|---|
| ... | |
| if( *sao_adaptive_region_enabled_flag* ) { | |
| slice_sao_luma_flag | u(1) |
| slice_sao_chroma_flag | u(1) |
| *if ( slice_sao_luma_flag ||* | |
| *slice_sao_chroma_flag ) {* | |
| *idx_sao_region_size* | u(4) |
| } | |
| } | |
| ... | |

In table 4, a single index is encoded that is representative of the size in X and Y and refers to a set (e.g. a table) of predefined sizes or ratios of the CTB sizes as in Table 1.

sao_adaptive_region_enabled_flag equal to 1 specifies that the region based sample adaptive offset process according to the present principles is applied. sao_adaptive_region_enabled_flag equal to 0 specifies that the region based sample adaptive offset process according to the present principles is not applied. In the latter case, the SAO filtering may only be applied on the CTBs. The flag may be encoded in a SPS as indicated in table 5, PPS or in a slice header.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to 0.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to 0.

TABLE 5

| seq_parameter_set_rbsp( ) { | Descriptor |
|---|---|
| ... | |
| sample_adaptive_offset_enabled_flag | u(1) |
| if ( sample_adaptive_offset_enabled_flag ) { | |
|    sao_adaptive_region_enabled_flag | u(1) |
| } | |
| ... | | sample_adaptive_offset_enabled_flag equal to 1 specifies that the sample adaptive offset process is applied to the reconstructed pictures of the sequence. sample_adaptive_offset_enabled_flag equal to 0 specifies that the sample adaptive offset process is not applied to the reconstructed pictures of the sequence.

Figure 6:
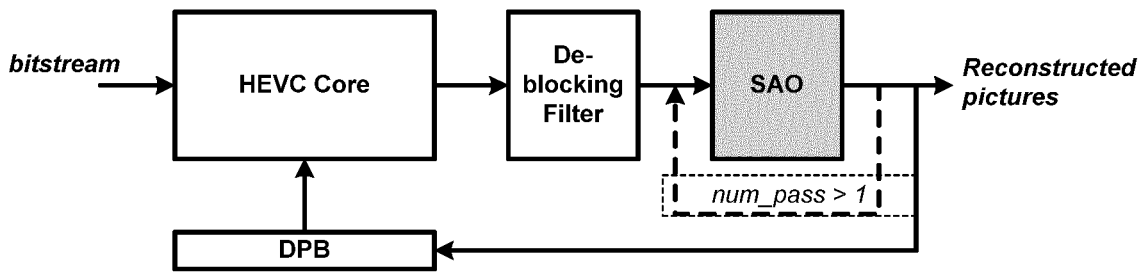
FIG. 6 illustrates a multi-pass filtering process according to a specific and non-limiting embodiment.

In another embodiment, multi-pass filtering is applied as depicted on FIG. 6. In one embodiment, the position and/or the size of the region is the same for the passes. In another embodiment, the position and/or the size of the region may be different for the passes. The syntax elements representative of the position and/or of the size are encoded for each pass in the slice header as indicated in the table 6 below. In a variant, the position is omitted and is inferred to be (0, 0).

TABLE 6

| slice_segment_header( ) { | Descriptor |
|---|---|
|   ... | |
|   if( sao_adaptive_region_enabled_flag ) { | |
|     slice_sao_luma_flag[0] | u(1) |
|     slice_sao_chroma_flag[0] | u(1) |
|     if ( slice_sao_luma_flag[0] \|\| | |
|     slice_sao_chroma_flag[0] ) { | |
|       sao_region_position[0][ ] | u(8) |
|       sao_region_size[0][ ] | u(8) |
|     } | |
|     for( pass = 1; pass < num_pass; pass++ ) { | |
|       if ( slice_sao_luma_flag[pass-1] \|\| | |
|       slice_sao_chroma_flag[pass-1] ) { | |
|         slice_sao_luma_flag[pass] | u(1) |
|         slice_sao_chroma_flag[pass] | u(1) |
|         if ( slice_sao_luma_flag[pass] \|\| | |
|         slice_sao_chroma_flag[pass] ) { | |
|           sao_region_position[pass][ ] | u(8) |
|           sao_region_size[pass][ ] | u(8) |
|         } | |
|       } | |
|     } | |
|   } | |
|   ... | |

Figure 7:
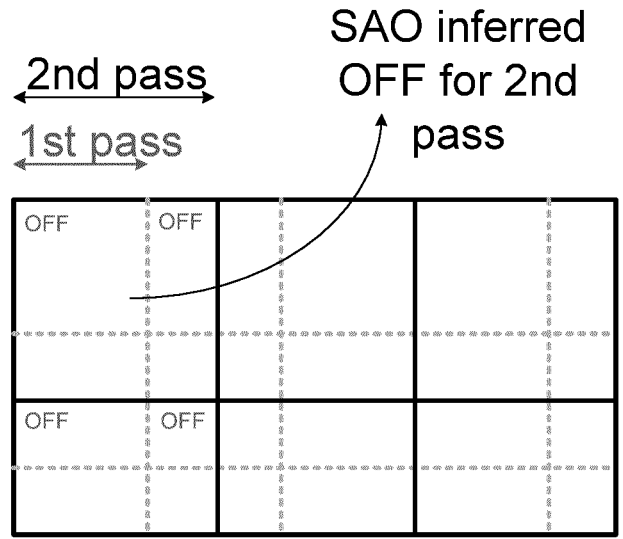
FIG. 7 depicts a portion of an image divided into several regions for sample adaptive offset filtering during a first and a second pass.

In the case of multi-pass filtering, if the SAO region of the current pass encompass several SAO regions of the previous pass and these encompassed SAO regions of the previous pass are in mode "OFF", then the SAO parameters for the current SAO region are not coded but inferred to be "OFF", as depicted in the example of FIG. 7. On FIG. 7, the regions for the current SAO filtering pass are delineated with the black lines while the regions for the previous SAO filtering pass are delineated with the grey dashed lines.

The SAO mode of current pass is considered to be OFF in the following cases (1) or (1+2) or (3):

1) SAO mode of previous pass encompassed by current SAO region is not MERGE (both sao_merge_left_flag and sao_merge_up_flag are zero) and both SAO sao_type_idx_luma and sao_type_idx_chroma are zero.
2) SAO mode of previous pass encompassed by current SAO region is MERGE (at least sao_merge_left_flag or sao_merge_up_flag is true) and the reconstructed values of sao_type_idx_luma and sao_type_idx_chroma are equal to zero.
3) All the reconstructed offset values (luma and chroma) of previous pass encompassed by current SAO region are equal to zero.

At step S140, the decoded slice obtained at step S120 is filtered by applying a filter, e.g. a sample adaptive offset filter, on the region identified by the information determined at step S130. SAO filtering is illustrated on FIG. 9. The filtered slice may then be stored in a buffer for further use during prediction of other image blocks. The SAO parameters of the SAO filter or more generally the filter parameters for the region are encoded in the bitstream. In the case where the slice is partitioned into several filtering regions as depicted on FIG. 5, several sets of filtering parameters are determined (one per filtering region) and encoded in the bitstream. Each region is filtered using its associated set of filtering parameters determined at step S130.

Figure 8:
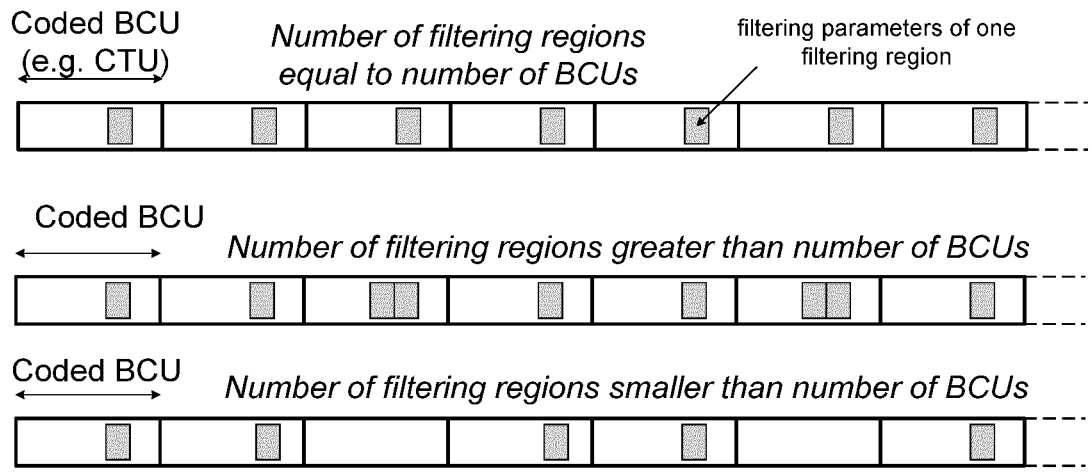
FIG. 8 represents an exemplary bitstream divided into several portions, each corresponding to a basic coding unit, e.g. a coding tree unit.

In the case where the number of filtering regions in the slice is the same as the number of basic coding units, e.g. CTUs, the filtering parameters, e.g. the SAO parameters, for a filtering region is encoded in a BCU as illustrated on FIG. 8 (first line).

In the case where the number of filtering regions is greater than the number of BCUs, one filtering region parameters set is encoded per BCU and remaining other filtering region parameters are encoded at the end of the slice. In a variant, the filtering region parameters are distributed on a regular basis among the coded CTU syntax elements (see example of FIG. 8, the second line) so as to avoid having all remaining filtering region parameters encoded with the last BCU. In this example the third and sixth BCU have two sets of filtering parameters encoded for different filtering regions.

In the case where the number of filtering regions is lower than the number of BCUs, one filtering region parameters set is encoded per BCU and remaining encoded BCUs have no filtering region parameters. In a variant, the filtering region parameters are distributed on a regular basis among the coded BCU syntax elements (see example in FIG. 8, the third line) so as to avoid having the last BCUs without filtering region parameters. In this example the third and sixth BCU have no SAO parameters encoded.

Figure 9:
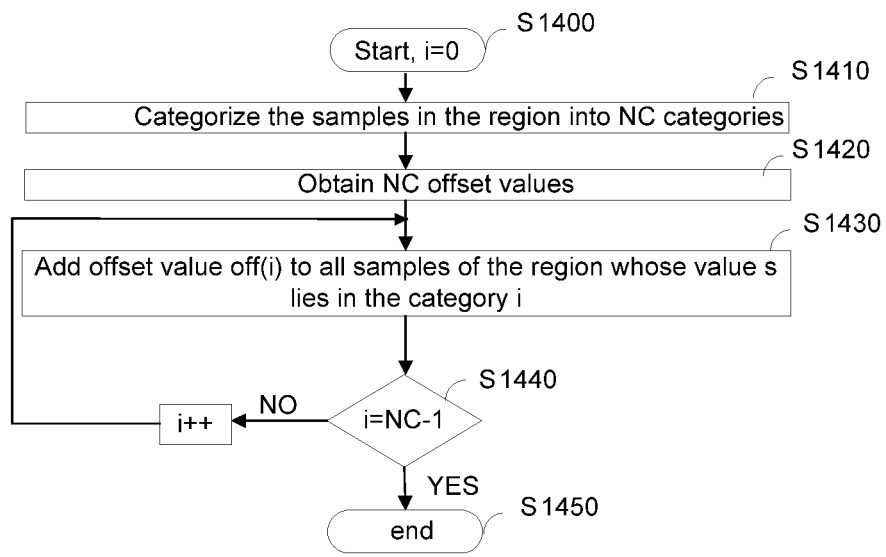
FIG. 9 is a flowchart of the SAO filtering of a region according to a specific and non-limiting embodiment.

FIG. 9 is a flowchart of the SAO filtering (S140) of a region according to a specific and non-limiting embodiment. The method starts at step S1400. At step S1410, the samples in the region are classified into n categories (e.g. 32 bands in case of BO mode). In step S1420, NC offsets are obtained. In step S1430, offset off(i) is added to all samples in the region whose sample value s lies in the category i: s=s+off(i). Step S1430 is repeated for all the categories (S1440). In case of EO, each reconstructed sample is classified into categories (sao_eo_class), depending on the local gradients. Offset values are coded, one for each category (one category has offset equal to zero).

Steps S120 to S140 may be iterated to encode all the slices of the image, to encode all the SAO region parameters and to apply adaptive offsets filtering on all the SAO regions of the image.

Figure 11:
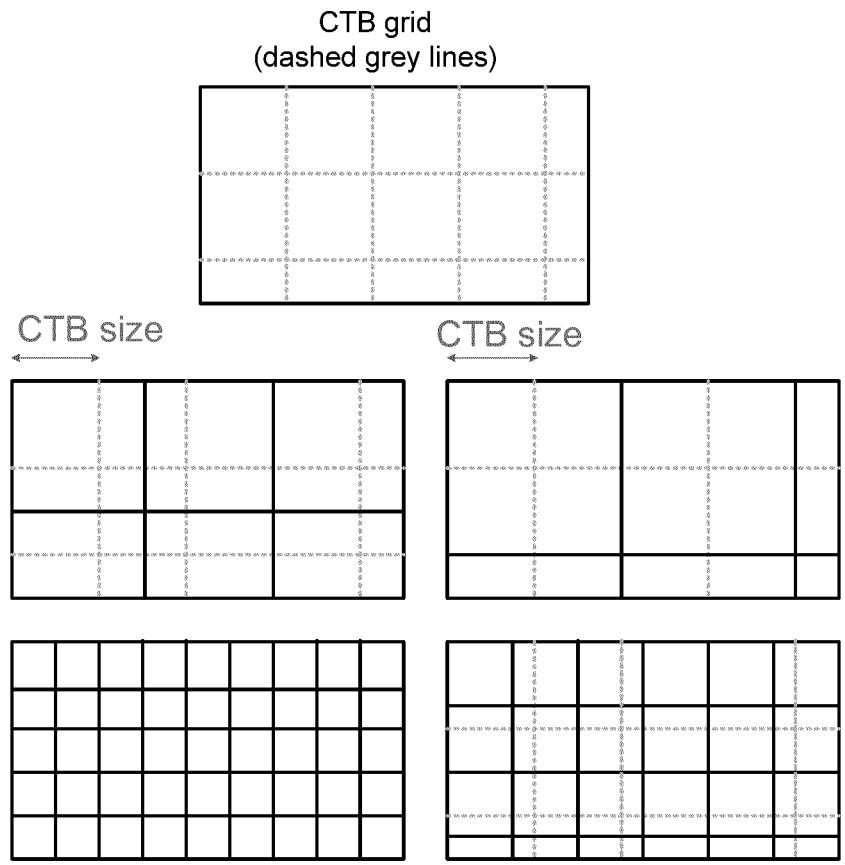
FIG. 11 depicts grids of coding tree blocks and grid of SAO regions.

Advantageously, the encoding method makes it possible to de-correlate the domain of application of the SAO parameters (region where the SAO offsets are applied also called SAO region) from the CTB grid, as depicted in FIG. 11 with square shapes. The SAO region can overlap the CTB grid partition. A SAO region can be larger or smaller than a CTB. On FIG. 11, the SAO regions are delineated by black lines while the CTB are delineated by grey dashed lines. On the second lines of FIG. 11, the SAO regions are larger than the CTB and on the third line of FIG. 11 the SAO regions are smaller than the CTB.

Figure 12:
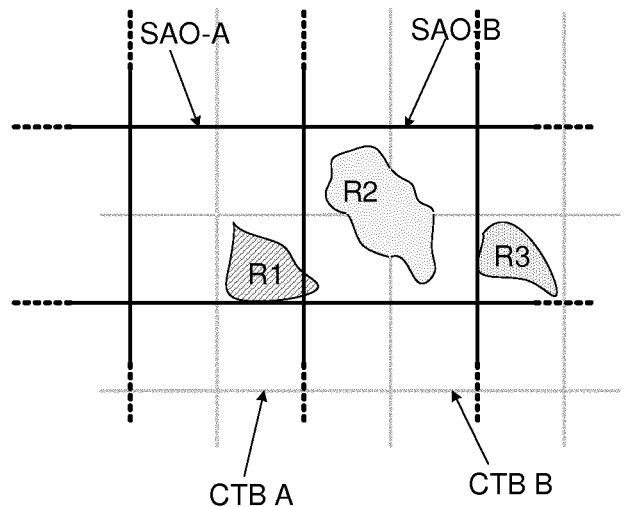
FIG. 12 depicts a portion of an image that comprises regions R1, R2 and R3, wherein R1 is fully included in a coding tree block CTB A, R3 is fully included in a coding tree block CTB B and R2 is partially included in the CTB A and partially in the CTB B.
Figure 13:
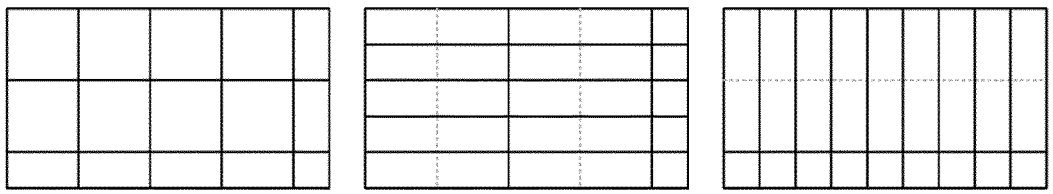
FIG. 13 depicts exemplary SAO regions of different shapes.

The encoding method according to the present principles makes it possible to apply the SAO parameters in a more efficient manner as depicted on FIG. 12. In this case, the SAO parameters SAO-A are applied to region R1, the parameters SAO-B are applied to region R2 and to a very small portion of region R1. The encoding method makes it possible to have SAO regions of different shape (e.g. square or rectangular) as depicted on FIG. 13.

Figure 14:
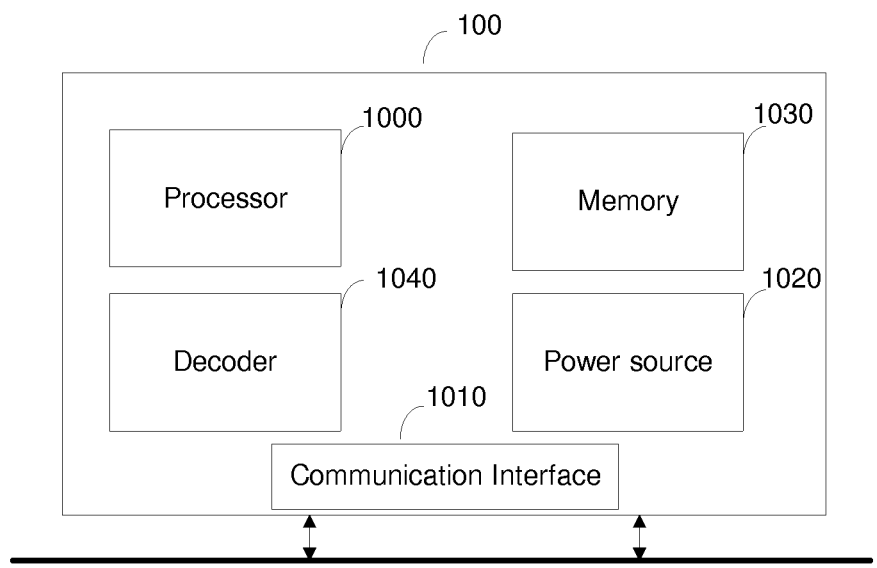
FIG. 14 represents an exemplary architecture of a receiver configured to decode an image from a bitstream to obtain a decoded image according to a non-limiting embodiment.

FIG. 14 represents an exemplary architecture of a receiver 100 configured to decode an image from a bitstream to obtain a decoded image according to a non-limiting embodiment.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data (e.g. the decoded image); and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The bitstream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded image may be sent to a destination, e.g. a display device. As an example, the decoded image is stored in a remote or in a local memory, e.g. a video memory or a RAM, a hard disk. In a variant, the decoded image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to FIG. 16. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display and
- a decoding chip or decoding device/apparatus.

Figure 15:
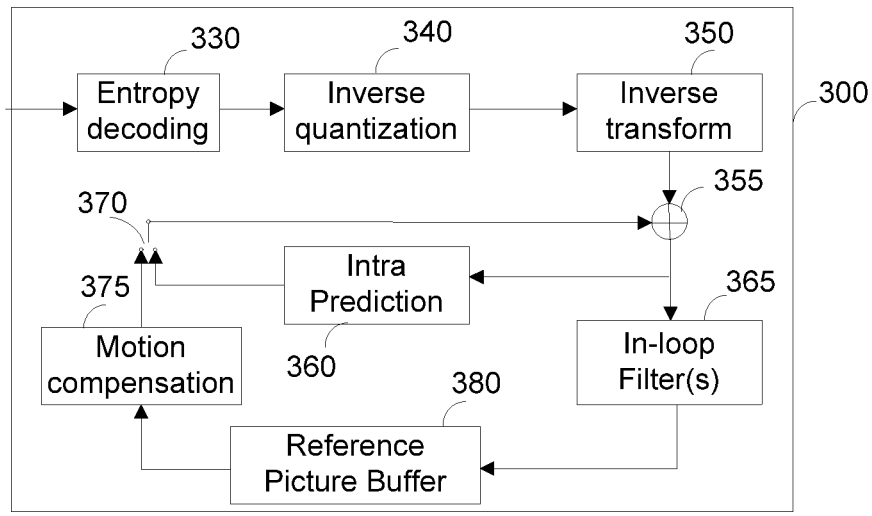
FIG. 15 illustrates a block diagram of an exemplary HEVC video decoder.
Figure 16:
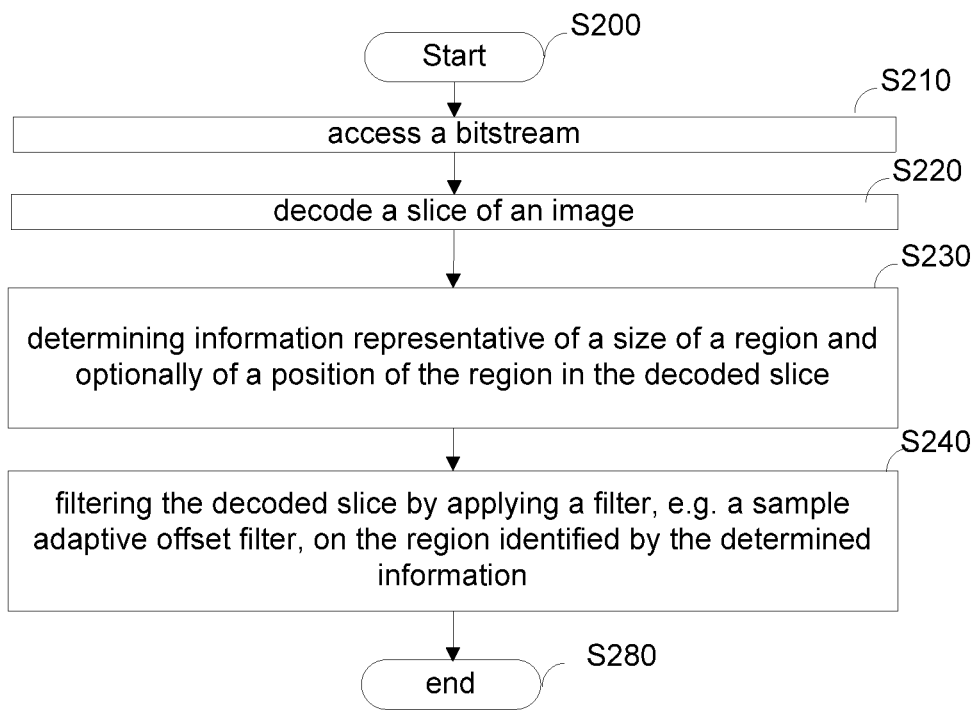
FIG. 16 represents a flowchart of a method for decoding an image from a bitstream according to a specific and non-limiting embodiment.

FIG. 15 illustrates a block diagram of an exemplary video decoder 300, e.g. an HEVC video decoder, adapted to execute the decoding method of FIG. 16. The video decoder 300 is an example of a receiver 100 or part of such a receiver 100. In the exemplary decoder 300, a bitstream is decoded by the decoder elements as described below. Video decoder 300 generally performs a decoding pass reciprocal to the encoding pass as described in FIG. 3, which performs video decoding as part of encoding video data.

In particular, the input of the decoder includes a video bitstream, which may be generated by the video encoder 400. The bitstream is first entropy decoded (330) to obtain transform coefficients, motion vectors, and other coded information. The transform coefficients are de-quantized (340) and inverse transformed (350) to decode residuals. The decoded residuals are then combined (355) with a predicted sample block (also known as a predictor) to obtain a decoded/reconstructed image block. The predicted sample block may be obtained (370) from intra prediction (360) or motion-compensated prediction (i.e., inter prediction) (375). As described above, AMVP and merge mode techniques may be used during motion compensation, which may use interpolation filters to calculate interpolated values for sub-integer samples of a reference block. An in-loop filter (365) is applied to the reconstructed image. The in-loop filter may comprise a deblocking filter and a SAO filter. The filtered image is stored at a reference image buffer (380).

FIG. 16 represents a flowchart of a method for decoding an image from a bitstream according to a specific and non-limiting embodiment.

The method starts at step S200. At step S210, a receiver 100 such as the decoder 300 accesses a bitstream. At step S220, the receiver decodes at least one slice of the image from the bitstream. Decoding the slice usually comprises decoding the blocks of the slice. Decoding a block usually but not necessarily comprises entropy decoding a portion of the bitstream representative of the block to obtain a block of transform coefficients, de-quantizing and inverse transforming the block of transform coefficients to obtain a block of residuals and adding a predictor to the block of residuals to obtain a decoded block.

At step S230, information representative of a size of a region and optionally of a position of the region in the decoded slice is determined. In an example, only information representative of the size of the region is determined, the position of the region in the decoded slice being inferred to be (0, 0). The region is also called a SAO region since it is a region where the SAO filtering is to be applied and for which a single set of SAO parameters is defined.

In the case where the slice is partitioned into several filtering regions, e.g. into SAO regions, as depicted on FIG. 5, several sets of filtering parameters are determined (one per filtering region).

In a first embodiment, the information representative of the size of the SAO region is inferred from a profile. In the HEVC standard, a combination of "profile", "tiers" and "level" makes it possible to define subsets of the entire bitstream syntax that is specified in this Recommendation International Standard. In HEVC, SAO filtering is applied on the samples of each CTB of a CTU. One could define a new profile for which the SAO region size is different from a CTB size. In the same way, the information representative of the position of the SAO region may also be inferred from the profile.

In another embodiment, the information representative of the position of the SAO region in the decoded slice is decoded from the bitstream, e.g. from a header of the slice or from a header of a slice segment. This information comprises, for example, syntax elements (e.g. sao_region_position_x and sao_region_position_y or sao_region_position[i] with i=0 for x and i=1 for y) that represent the coordinates in x and y of one sample of the SAO region in the decoded slice (e.g. its top-left sample as depicted on FIG. 5 for the second column/row filtering region). This embodiment is illustrated in table 2. In a variant, the position is decoded relatively to the CTB size. As an example, the information comprises syntax element(s) (e.g. k_x and k_y) that represent ratio(s) of CTB size. In the case where the CTB_size is equal to 256 and the decoded ratios are k_x=0.25 and k_y=0.25, the SAO region (e.g. its top-left sample) is located at x=64 and y=64. In another example, the position in x and y of the SAO region of the second column/line may be equal to CTB size/$2^n$. In this latter case, the syntax element may indicate the value of n. In yet another variant, the information is a syntax element idx_sao_region_position which is an index defining the position of the SAO region in a set of predefined positions. This latter case is illustrated in table 3.

In an example, the regions are shifted with respect to the CTB grid. In this latter case, the information is a syntax element indicating the value of the shift relatively to the CTB grid.

In the same way, the information representative of the size of the region may also be decoded from the bitstream, e.g. from a header of the slice or from a header of a slice segment. This information comprises, for example, syntax elements (e.g. sao_region_size_x and sao_region_size_y or sao_region_size[i] with i=0 for x and i=1 for y) that represent the size in x and y of the SAO region. In a variant, a single syntax element that represents the size of the SAO region in one dimension, either x or y, is decoded in the case where the SAO region is known to be square. In a variant, the size is decoded relatively to the CTB size. As an example, the information comprises syntax element(s) (e.g. k_x and k_y) that represent ratio(s) of CTB size. In the case where the CTB size is equal to 128 and the decoded ratios are k_x=0.5 and k_y=0.5, the SAO region's size is equal to 64×64. In a variant, a single ratio is decoded (either k_x or k_y) in the case where the SAO region is known to be square. In yet another variant, the information is a syntax element idx_sao_region_size which is an index defining the size of the SAO region in a set of predefined sizes as illustrated in tables 3 and 4. In the case where the CTB_size is equal to 128 and the SAO region is of square shape, the size of the region may be determined by decoding an index idx_region_size that may take 4 values {0, 1, 2, 3}. Each index corresponds to a size of the region. The index 0 corresponds to a size equal to the CTB size (128×128), the index 1 corresponds to a size equal to 1.5 times the CTB size (192×192), the index 2 corresponds to twice the CTB size (256×256), and the index 3 corresponds to a size equal to 2.5 times the CTB size (384×384). Advantageously, the number of indices is limited by the picture or slice size. For example, if the intersection of a first SAO region whose size is identified by a first index idx1 and of the slice is the same as the intersection of a second SAO region whose size is identified by a second index idx2 and of the slice, then the SAO region size corresponding to idx2 is removed and the number of index range values is reduced by one. This is depicted in example of FIG. 10 where the intersection corresponds to the slice itself.

The size of the region may be obtained by decoding a single index idx_sao_region_size coded with respect to the CTB size. For example, idx_sao_region_size may take 8 values in the set {0, 1 . . . 7}. The index value indicates a horizontal ratio and a vertical ratio to be applied on the CTB size to obtain the region size as indicated in table 1. As an example, for a CTB of size 128×128, in the case where the idx_sao_region_size=2, the region is of rectangular shape (the horizontal and vertical ratios are different). Its width is equal to 256 (2.0*128) and its height is equal to 128 (1.0*128). As another example, for a CTB of size 128×128, in the case where the idx_sao_region size=7, the region is of square shape (the horizontal and vertical ratios are different). Its width is equal to 512 (4.0*128) and its height is equal to 512 (4.0*128). In the case where the region is known to be square, the index may refer to a single ratio since the same ratio is to be applied in both dimensions.

Once a size and possibly a position of a region is determined, the slice may be further partitioned into several regions by repeating the same pattern as depicted on FIG. 5. The first lines/column of SAO regions may be slightly different if the values of sao_region_position_x and sao_region_position_y are not zero. The last line/column of SAO regions may be slightly different since the slice size is not necessarily a multiple of the region's size.

In a specific and non-limiting embodiment, the syntax elements representative of the position and of the size are decoded from the slice header as indicated in the tables 2, 3 and 4 below. In these tables, the syntax elements that differs from the HEVC syntax elements are indicated in italics. The position may be omitted and inferred to be (0, 0).

In table 4 a single index is decoded that is representative of the size in X and Y and refers to a set (e.g. a table) of predefined sizes or ratios of the CTB sizes as in Table 1.

In another embodiment, multi-pass filtering is applied as depicted on FIG. 6. In one embodiment, the position and/or the size of the region is the same for the passes.

In another embodiment, the position and/or the size of the region may be different for the passes. The syntax elements representative of the position and/or of the size are decoded for each pass from the slice header as indicated in the table 6 below. In a variant, the position is omitted and is inferred to be (0, 0).

In the case of multi-pass filtering, if the SAO region of the current pass encompass several SAO regions of the previous pass and these encompassed SAO regions of the previous pass are in mode "OFF", then the SAO parameters for the current SAO region are not decoded from the bitstream but inferred to be "OFF", as depicted in the example of FIG. 7 in the same manner as in the encoding method.

At step S240, the decoded slice obtained at step S220 is filtered by applying filter, e. a SAO filter, on the region identified by the information determined at step S230. SAO filtering is illustrated by FIG. 9. The filtered slice may then be stored in a reference pictures buffer for further use during prediction of other image blocks. The parameters of the filter for the region are decoded from the bitstream. The parameters of a region may be decoded at step S230.

In the case where the slice is partitioned into several filtering regions as depicted on FIG. 5, several sets of filtering parameters are decoded and the filtering regions are filtered using the decoded sets of filtering parameters.

In the case where the number of filtering regions in the slice is the same as the number of BCUs, the parameter for a filtering region is decoded from a BCU as illustrated on FIG. 8 (first line).

In the case where the number of filtering regions is greater than the number of BCUs, one filtering region parameters set is decoded per BCU and remaining other filtering region parameters are decoded at the end of the slice. In a variant, the filtering region parameters are distributed uniformly among the coded BCU syntax elements (see FIG. 8, the second line example).

In the case where the number of filtering regions is lower than the number of BCUs one filtering region parameters set is decoded per BCU and remaining decoded BCUs have no filtering region parameters. In a variant, the filtering region parameters are distributed uniformly among the coded BCU syntax elements (see FIG. 8, the third line example).

Steps S220 to S240 may be iterated to decode all the slices of an image, decode all the filtering region parameters and to apply adaptive offsets filtering on all the filtering regions of the image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:
1. A decoding method for decoding an image, the decoding method comprising, for at least one slice of the image:
   decoding the slice from a bitstream;
   determining information representative of a size of a region of the decoded slice, the size being different from a size of a basic coding block used for decoding the slice, wherein the size of the region includes at least one of a region width and a region height, and wherein the size of the basic coding block includes at least one of a basic coding block height and a basic coding block width; and filtering the decoded slice by applying a filter on the region identified by the determined information;

wherein determining the information comprises decoding a single index from a header of the slice, wherein the single index indicates at least one of a horizontal ratio and a vertical ratio with respect to the size of the basic coding block, wherein the vertical ratio represents a ratio of the region height and the basic coding block height and the horizontal ratio represents a ratio of the region width and the basic coding block width, and wherein the single index is utilized to obtain the size of the region.

2. The decoding method according to claim 1, wherein the information is further representative of a position of the region within the decoded slice.

3. The decoding method according to claim 1, wherein the information is different for at least two decoded slices or pictures of the same sequence.

4. The decoding method according to claim 1, wherein the region is a rectangle.

5. The decoding method according to claim 1, wherein, applying the filter on the region comprises applying the filter during successive filtering passes and wherein determining the information comprises determining the information for each filtering pass.

6. A encoding method for encoding an image, the encoding method comprising, for at least one slice of the image:

encoding the slice into a bitstream and decoding the slice to obtain a decoded slice;

determining and encoding information representative of a size of a region of the decoded slice, the size being different from a size of a basic coding block used for encoding the slice, wherein the size of the region includes at least one of a region width and a region height, and wherein the size of the basic coding block includes at least one of a basic coding block height and a basic coding block width; and filtering the decoded slice by applying a filter on the region identified by the determined information;

wherein encoding the information comprises encoding a single index in a header of the slice, wherein the single index indicates at least one of a horizontal ratio and a vertical ratio with respect to the size of the basic coding block, wherein the vertical ratio represents a ratio of the region height and the basic coding block height and the horizontal ratio represents a ratio of the region width and the basic coding block width, and wherein the single index is utilized to obtain the size of the region.

7. The encoding method according to claim 6, wherein the information is further representative of a position of the region within the decoded slice.

8. The encoding method according to claim 6, wherein the information is different for at least two decoded slices or pictures of the same sequence.

9. The encoding method according to claim 6, wherein the region is a rectangle.

10. The encoding method according to claim 6, wherein, applying the filter on the region comprises applying the filter during successive filtering passes and wherein determining the information comprises determining the information for each filtering pass.

11. A decoding device comprising one or more processors and at least one memory having stored instructions operative, when executed by the one or more processors, to cause the decoding device to perform decoding of an image comprising:

decoding the slice from a bitstream;

determining information representative of a size of a region of the decoded slice, the size being different from a size of a basic coding block used for decoding the slice, wherein the size of the region includes at least one of a region width and a region height, and wherein the size of the basic coding block includes at least one of a basic coding block height and a basic coding block width; and filtering the decoded slice by applying a filter on the region identified by the determined information;

wherein determining the information comprises decoding a single index from a header of the slice, wherein the single index indicates at least one of a horizontal ratio and a vertical ratio with respect to the size of the basic coding block, wherein the vertical ratio represents a ratio of the region height and the basic coding block height and the horizontal ratio represents a ratio of the region width and the basic coding block width, and wherein the single index is utilized to obtain the size of the region.

12. The decoding device of claim 11, wherein the information is further representative of a position of the region within the decoded slice.

13. The decoding device according to claim 11, wherein the information is different for at least two decoded slices or pictures of the same sequence.

14. The decoding device according to claim 11, wherein the region is a rectangle.

15. The decoding device according to claim 11, wherein, applying the filter on the region comprises applying the filter during successive filtering passes and wherein determining the information comprises determining the information for each filtering pass.

16. An encoding device comprising one or more processors and at least one memory having stored instructions operative, when executed by the one or more processors, to cause the encoding device to perform encoding of an image comprising:

encoding a slice of the image into a bitstream and decoding the slice to obtain a decoded slice;

determining and encoding information representative of a size of a region of the decoded slice, the size being different from a size of a basic coding block used for encoding the slice, wherein the size of the region includes at least one of a region width and a region height, and wherein the size of the basic coding block includes at least one of a basic coding block height and a basic coding block width; and filtering the decoded slice by applying a filter on the region identified by the determined information;

wherein encoding the information comprises encoding a single index in a header of the slice, wherein the single index indicates at least one of a horizontal ratio and a vertical ratio with respect to the size of the basic coding block, wherein the vertical ratio represents a ratio of the region height and the basic coding block height and the horizontal ratio represents a ratio of the region width and the basic coding block width, and wherein the single index is utilized to obtain the size of the region.

17. The encoding device of claim 16, wherein the information is further representative of a position of the region within the decoded slice.

18. The encoding device according to claim 16, wherein the information is different for at least two decoded slices or pictures of the same sequence.

19. The encoding device according to claim 16, wherein the region is a rectangle.

20. The encoding device according to claim 16, wherein, applying the filter on the region comprises applying the filter during successive filtering passes and wherein determining the information comprises determining the information for each filtering pass.

21. A non-transitory processor-readable storage medium having stored instructions that, when executed by a processor, cause the processor to perform:

decoding a slice of an image from a bitstream;

determining information representative of a size of a region of the decoded slice, the size being different from a size of a basic coding block used for decoding the slice, wherein the size of the region includes at least one of a region width and a region height and wherein the size of the basic coding block includes at least one of a basic coding block height and a basic coding block width;

filtering the decoded slice by applying a filter on the region identified by the determined information;

wherein determining the information comprises decoding a single index from a header of the slice, wherein the single index indicates at least one of a horizontal ratio and a vertical ratio with respect to the size of the basic coding block, wherein the vertical ratio represents a ratio of the region height and the basic coding block height and the horizontal ratio represents a ratio of the region width and the basic coding block width, and wherein the single index is utilized to obtain the size of the region.

22. The non-transitory processor readable medium of claim 21, wherein the information is further representative of a position of the region within the decoded slice.

23. The non-transitory processor readable medium according to claim 21, wherein the information is different for at least two decoded slices or pictures of the same sequence.

24. The non-transitory processor readable medium according to claim 21, wherein the region is a rectangle.

25. The non-transitory processor readable medium according to claim 21, wherein, applying the filter on the region comprises applying the filter during successive filtering passes and wherein the bitstream comprises the information for each filtering pass.

26. The decoding method according to claim 1, further comprising further partitioning the slice into additional regions and assigning, to each of the additional regions, an additional single index representing a size of each additional region coded with respect to the size of the basic coding block.

27. The decoding method according to claim 1, wherein the single index represents one of a set of values corresponding to region sizes relative to the size of the basic coding block.

28. The decoding method according to claim 27, wherein each value of the set of values maps to a different region size and refers to a respective horizontal ratio and a respective vertical ratio.

29. The decoding method according to claim 27, wherein each value of the set of values maps to a different region size and refers to either a respective horizontal ratio or a respective vertical ratio.

* * * * *

UNITED STATES PATENT AND TRADEMARK OFFICE
CERTIFICATE OF CORRECTION

| | | |
|---|---|---|
| PATENT NO. | : 11,032,542 B2 | Page 1 of 1 |
| APPLICATION NO. | : 16/477514 | |
| DATED | : June 8, 2021 | |
| INVENTOR(S) | : Philippe Bordes, Tangi Poirier and Fabien Racape | |

It is certified that error appears in the above-identified patent and that said Letters Patent is hereby corrected as shown below:

In the Claims

Claim 6, Column 21, Line 30: replace "A" with --An--.

Claim 22, Column 24, Line 1: replace "processor readable" with --processor-readable--.

Claim 23, Column 24, Line 4: replace "processor readable" with --processor-readable--.

Claim 24, Column 24, Line 8: replace "processor readable" with --processor-readable--.

Claim 25, Column 24, Line 10: replace "processor readable" with --processor-readable--.

Signed and Sealed this
Nineteenth Day of July, 2022

Katherine Kelly Vidal
*Director of the United States Patent and Trademark Office*